3,536,795
PREVENTION OF SWELLING SALT PRE-
CIPITATION IN REVERSE OSMOSIS
FABRICATION
Fred C. Burnette, Walnut, Calif., assignor, by direct and mesne assignments, of one-half each to the United States of America as represented by the Secretary of the Interior, and Aerojet-General Corporation, El Monte, Calif.
No Drawing. Filed Nov. 6, 1967, Ser. No. 680,977
Int. Cl. B29d 7/02, 21/00
U.S. Cl. 264—49        5 Claims

ABSTRACT OF THE DISCLOSURE

The precipitate caused by hydrolysis of zinc swelling salts in polymeric membrane casting mixes is prevented by the addition of hydrochloric acid.

BACKGROUND OF THE INVENTION

Field of the invention

This invention relates to improvements in the production of swollen or gelled polymeric membranes. More particularly, it relates to the production of gelled membranes cast from solutions containing zinc swelling salts which are subject to hydrolysis and precipitation. Polymeric reverse osmosis membranes, especially those made from cellulose esters are generally fabricated in this manner.

DESCRIPTION OF PRIOR ART

Most successful reverse osmosis membranes consist of an asymmetric polymeric cellulose ester membrane having a very thin layer of dense polymer in association with a thicker layer of less dense polymer having a swollen or gelled structure. Membranes of this type are described in U.S. Pats. 3,133,132, 3,133,137 and 3,170,867 to Loeb et al., U.S. Pat. 3,290,286 to Kesting and 3,332,894 to Cantor et al. As with these and other similar membranes, a casting solution is prepared, the membrane is cast on a smooth surface, floated off by immersion and then may be subjected to elevated temperatures or pressure treatments. A common treatment for cellulose acetate membranes is to immerse the membranes in a cool bath for removal from the casting surface and then subject the membranes to a thermal treatment which is generally a heating at from about 75° C. to 100° C.

To enhance the formation of a swollen or gelled membrane, swelling agents are normally added to the casting solution. Among the swelling agents in use are: solutions of magnesium perchlorate, magnesium bromide, zinc bromide, a solution containing all three of the aforementioned agents and a solution of zinc chloride. The use of zinc halides, particularly zinc chloride, possesses certain advantages. For example, product fluxes are higher, release from the casting surface subsequent to gelation occurs more swiftly, and there is less tendency for the edges of the membrane to curl during the various post-gelation handling procedures.

Through the above advantages render the use of zinc chloride as a swelling agent in membrane casting mixes desirable, I have found that zinc chloride has a tendency to form a precipitate within the casting solutions. Precipitates or impurities of any kind are highly undesirable in casting mixes as they lead to imperfections in membrane structure.

Accordingly, the primary object of the present invention is to provide a method to prevent precipitate formation in casting solutions when a zinc salt, particularly zinc chloride, is used as a swelling agent. Other objects, advantages and features of this invention will become apparent upon consideration of the following description of its preferred embodiments.

DESCRIPTION OF THE PREFERRED EMBODIMENTS

Zinc chloride is hydroscopic in nature and dissolves readily in water to form the slightly acidic $Zn(H_2O)_4^{++}$ ion and hence is generally thought of as a weakly acid salt.

The hydrolysis of zinc chloride occurs according to the following reaction:

$$ZnCl_2 + H_2O \rightleftharpoons Zn(OH)_2 + 2HCl$$

Since the hydroxide is a very weak base and the chloride is a very strong acid it would be expected that the equilibrium lies on the left side of the reaction preventing the formation of enough hydroxide to cause precipitation.

I have found however that the aforementioned precipitate caused by the introduction of zinc chloride in casting mixes is in fact zinc hydroxide. I have also found that this precipitate can be eliminated by the addition of small quantities of hydrochloric acid to the casing mix. The addition of acid prevents formation of the hydroxide precipitate by reacting with the hydroxide according to the following reaction:

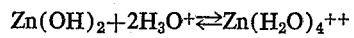
$$Zn(OH)_2 + 2H_3O^+ \rightleftharpoons Zn(H_2O)_4^{++}$$

The amount of acid necessary will of course depend upon the composition of the casting mix. Generally, precipitation will be successfully avoided if the pH of the casting solution is kept at about 4.9 or below. Other acids may be used to lower the pH however hydrochloric is the preferred agent. Precipitation of a zinc bromide swelling salt may also be prevented by acid addition.

Where the present invention is used in cellulose acetate casting mixes to form reverse osmosis membranes which are subsequently heat treated according to conventional practice to form what is known in the art as a "modified" gel structure, I have found that the heat treatment should be carried out at a temperature range of 70° C. to 90° C. depending upon the desired salt rejection.

The following examples are illustrative of the invention:

EXAMPLE 1

A standard cellulose acetate casting mix was prepared containing the following ingredients:

| | Gms. |
|---|---|
| Cellulose | 66.6 |
| Acetone | 200.1 |
| Water (distilled) | 30.0 |
| Zinc chloride | 15.0 |

The casting solution was prepared by first mixing the zinc chloride, water and acetone in a bottle. Then the cellulose acetate was slowly added while agitating. After all the cellulose acetate had been added, the solution was gently agitated until mixing was complete. Precipitation of $Zn(OH)_2$ was observed.

EXAMPLE 2

A casting solution having a composition as that in Example 1 was prepared with the exception that 0.25 gms. of HCl were added with the zinc chloride, water and acetone. No $Zn(OH)_2$ precipitate was observed.

EXAMPLE 3

A standard cellulose acetate mix was prepared containing the following ingredients:

| | Gms. |
|---|---|
| Cellulose acetate | 66.6 |
| Acetone | 200.1 |
| Water (distilled) | 30.0 |
| Magnesium perchlorate | 3.0 |
| Magnesium bromide, hexahydrate | 3.0 |
| Zinc bromide | 3.0 |

The solution was prepared by first mixing the acetone, water, magnesium perchlorate, magnesium bromide and zinc bromide in a bottle. Then the cellulose acetate was slowly added while agitating. After all the cellulose acetate was slowly added while agitating. After all the cellulose acetate had been added, the solution was gently agitated until mixing was complete. Precipitation of $Zn(OH)_2$ was observed.

EXAMPLE 4

A casting solution having the composition as that in Example 3 was prepared with the exception that 0.5 gm. of HCl were added with the swelling salts, water, and acetone. No $Zn(OH)_2$ precipitate was observed.

While the process of the present invention has been described in terms of preferred embodiments, alterations and adaptations are possible within the spirit and scope of the invention concepts which are particularly pointed out and claimed hereinbelow.

What is claimed is:

1. In the preparation of polymeric cellulose ester reverse osmosis membranes from aqueous casting solutions containing a swelling salt selected from the group consisting of zinc chloride and zinc bromide, said swelling salt being subject to hydrolysis and precipitation, the improvement comprising adding an amount of acid to the casting solution sufficient to prevent said precipitation.

2. The method of claim 1 wherein the acid is hydrochloric and wherein the amount of acid is sufficient to lower the pH of the casting solution to about 4.9 or below 3. The method of claim 1 wherein said swelling salt is zinc chloride.

4. The method of claim 1 wherein said casting solution contains cellulose acetate.

5. The method of claim 4 wherein said membrane is heated to a temperature from 70° to 90° C. after casting.

References Cited

UNITED STATES PATENTS

| 3,250,701 | 5/1966 | Watson et al. | 264—41 XR |
| 3,283,042 | 11/1966 | Loeb et al. | 264—49 |
| 3,310,488 | 3/1967 | Loeb et al. | 264—49 XR |
| 3,364,288 | 1/1968 | Loeb | 264—49 |

OTHER REFERENCES

Manjikian, S. "Improvement in Fabrication Techniques for Reverse Osmosis Desalination Membranes." First International Symposium on Water Desalination, Washington, D.C., Oct. 3–9, 1965, pp. 1–2.

Moeller, Therald, "Inorganic Chemistry; An Advanced Textbook," New York, John Wiley, © 1952, pp. 501–503.

PHILIP E. ANDERSON, Primary Examiner

U.S. Cl. X.R.

106—196; 210—500; 264—330